United States Patent
Nungesser et al.

(10) Patent No.: US 9,645,289 B2
(45) Date of Patent: May 9, 2017

(54) OPTICAL EFFECT COATING

(71) Applicant: Rohm and Haas Company, Philadelphia, PA (US)

(72) Inventors: Edwin Hugh Nungesser, Horsham, PA (US); Edward La Fleur, Holland, PA (US); Adam Fasula, Lansdale, PA (US); Partha S. Majumdar, Harleysville, PA (US)

(73) Assignee: ROHM AND HAAS COMPANY, Philadelphia, PA (US)

(*) Notice: Subject to any disclaimer, the term of this patent is extended or adjusted under 35 U.S.C. 154(b) by 0 days.

(21) Appl. No.: 15/025,263

(22) PCT Filed: Sep. 24, 2014

(86) PCT No.: PCT/US2014/057203
§ 371 (c)(1),
(2) Date: Mar. 26, 2016

(87) PCT Pub. No.: WO2015/048124
PCT Pub. Date: Apr. 2, 2015

(65) Prior Publication Data
US 2016/0216415 A1    Jul. 28, 2016

Related U.S. Application Data

(60) Provisional application No. 61/883,588, filed on Sep. 27, 2013.

(51) Int. Cl.
*G02B 5/128*  (2006.01)
*B05D 5/06*   (2006.01)
*G02B 1/04*   (2006.01)

(52) U.S. Cl.
CPC ............. *G02B 5/128* (2013.01); *B05D 5/061* (2013.01); *G02B 1/04* (2013.01)

(58) Field of Classification Search
CPC .......... G02B 5/128; G02B 1/04; G02B 1/041; G02B 1/10; G02B 1/12; B05D 5/061; B05D 5/063
(Continued)

(56) References Cited

U.S. PATENT DOCUMENTS 3,801,183 A    4/1974  Sevelin et al.
5,784,198 A    7/1998  Nagaoka
(Continued)

FOREIGN PATENT DOCUMENTS

EP    0 305 074 A2    3/1989
GB    1 477 175 A     6/1977

OTHER PUBLICATIONS

Kruger, et al., "Synthesis and pH-Selective Adsorption of Latex Particles onto Photolithographically Patterned Silane Layers", J. Colloid and Interface Science, vol. 252, No. 2, pp. 331-338 (2002).
(Continued)

*Primary Examiner* — James Phan
(74) *Attorney, Agent, or Firm* — Carl P. Hemenway

(57) ABSTRACT

Provided is an article having a condition-dependent image, said article comprising
  (a) a substrate having a surface,
  (b) upon the surface of the substrate, one or more layers of a clear coating comprising a plurality of beads.
Also provided are a method of producing such an article and a method of observing the image on such an article.

10 Claims, 10 Drawing Sheets

Figure 1:
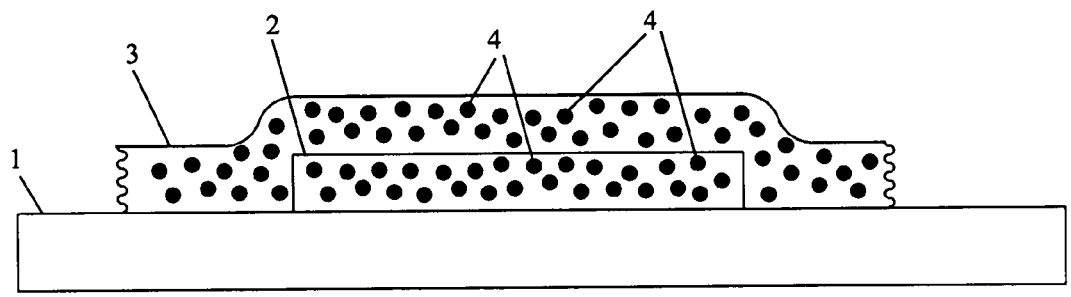

(58) Field of Classification Search
USPC .................................. 359/534, 536, 537, 539
See application file for complete search history.

(56) References Cited

U.S. PATENT DOCUMENTS

| | | |
|---|---|---|
| 7,170,688 B2 | 1/2007 | Handerek et al. |
| 7,768,602 B2 | 8/2010 | LaFleur et al. |
| 8,395,568 B2 * | 3/2013 | Ray .................... B82Y 20/00 257/80 |
| 2009/0097123 A1 | 4/2009 | LaFleur et al. |
| 2013/0154250 A1 | 6/2013 | Dunn et al. |

OTHER PUBLICATIONS

Sun, et al., "Large-scale optical traps on a chip for optical sorting", App. Physics Letters, vol. 90, No. 3, pp. 031107-1-031107-3 (2007).
Hirai, et al., "Lens functions of polymer microparticle arrays", J. Colloids and Surfaces, vol. 153, No. 1-3, pp. 503-513 (1999).

* cited by examiner

OPTICAL EFFECT COATING

It is often desirable to create an article that bears a condition-dependent image, which is an article that has a surface that has a uniform appearance when observed under ordinary lighting conditions but that has a non-uniform appearance under certain specific conditions of lighting and/or observation. For example, it is sometimes desirable to have an article with a flat surface that appears like a uniform, featureless surface under diffuse lighting conditions and that appears to have an image when it is lit by a single light source and is viewed from a vantage point that is near the light source. Such an article could serve, for example, as a warning sign that is only visible under conditions in which it is needed. As another example, such an article could carry an identifying mark that would not affect its appearance under ordinary conditions but would be visible under specific conditions of lighting and observation; such an identifying mark could provide a method of easily distinguishing the article from counterfeit imitations.

U.S. Pat. No. 3,801,183 describes a sheet material having both retro-reflective legend areas and retro-reflective background areas which are substantially indistinguishable under ordinary diffuse light viewing conditions but are clearly distinguishable under retro-reflective viewing conditions. The sheet material described by U.S. Pat. No. 3,801,183 includes a monolayer of glass microspheres of at least 1.8 refractive index having a partially light-transmissive mirror in optical contact the rear surface of the microspheres.

It is desired to provide an article with a condition-dependent image. When such an article contains spherical beads, it is desirable that the existence of the condition-dependent image does not require that any mirror or other reflective object be in contact or in close proximity to the individual beads. Independently, it is also desirable that construction of the article does not require specialized manufacturing techniques but only requires ordinary techniques of applying coatings. Independently, it is also desirable that construction of the article does not require placing the beads in any specific arrangement such as partially embedding or such as arranging the beads in a monolayer.

Such an article may have a coating on its surface. It is desirable that such a coating be clear (i.e., with little or no haze or opacity). Such coatings often have a continuous polymeric binder that has index of refraction of 1.4 to 1.7. Such coatings also often have one or more ingredients that are present as discrete particles distributed in the continuous polymeric binder; it is desired that such discrete particles have index of refraction that is close in value to that of the polymeric binder, to reduce haze and/or opacity.

The following is a statement of the invention.

A first aspect of the present invention is an article having a condition-dependent image, said article comprising
  (a) a substrate having a surface,
  (b) upon the surface of the substrate, one or more layers of a clear coating comprising a plurality of beads having a weight-average diameter,
wherein there are a first area and a second area on the surface of said substrate, wherein the first area has a total thickness of all layers of said clear coating of T1, wherein the second area has a total thickness of all layers of said clear coating of T2, wherein the difference between T1 and T2 is equal to or greater than the weight average diameter of said plurality of beads,
    wherein said beads are spherical,
    wherein said beads do not contain voids,
    wherein said beads comprise organic polymer, and
    wherein the index of refraction of said beads is 1.4 to 1.65.

A second aspect of the present invention is a method of producing an article having a condition-dependent image, said method comprising
  (A) providing a substrate having a surface
  (B) applying an area AB of a layer LB of a coating composition CB on the surface of the substrate, then drying said layer LB or allowing said layer LB to dry, wherein coating composition CB, when dry, forms a clear coating,
  (C) then applying an area AC of a layer LC of a coating composition CC on the surface of the substrate, so that area AB overlaps area AC, then drying layer LC or allowing said layer LC to dry, wherein coating composition CC, when dry, forms a clear coating,
    wherein each of said coating composition CB and said coating composition CC independently comprises a binder and plurality of beads having a weight-average diameter,
      wherein there are a first area and a second area on the surface of said substrate,
    wherein the first area has a total thickness of all layers of said clear coatings of T1,
    wherein the second area has a total thickness of all layers of said clear coatings of T2,
    wherein the difference between T1 and T2 is greater than the weight average diameter of said plurality of beads,
      wherein said beads are spherical,
      wherein said beads comprise organic polymer, and
      wherein the index of refraction of said beads is 1.4 to 1.65.

A third aspect of the present invention is a method of producing an image comprising
  A providing the optical effect article of the first aspect,
  B illuminating the surface of said article with a single, non-extended light source, wherein said light source lies on a line L1 that passes through the center of said light source and the center of said surface,
  C simultaneous with step B, observing said surface from an observation point that is on the same side of said surface as said light source and that lies on a line L2 that passes through said observation point and the center of said surface, wherein the angle between said line L1 and said line L2 is 10 degrees or less.

The following is a brief description of the drawings.

FIG. 1 shows a cross section of an article of the present invention in which substrate 1 is coated with two layers of clear coating: layer 2 and layer 3. Beads 4 are shown dispersed in the coatings. The size of the beads have been enlarged in the drawings for clarity. In FIG. 1, layer 3 both lies on top of layer 2 and extends to the sides beyond the boundaries of layer 2.

Figure 2:
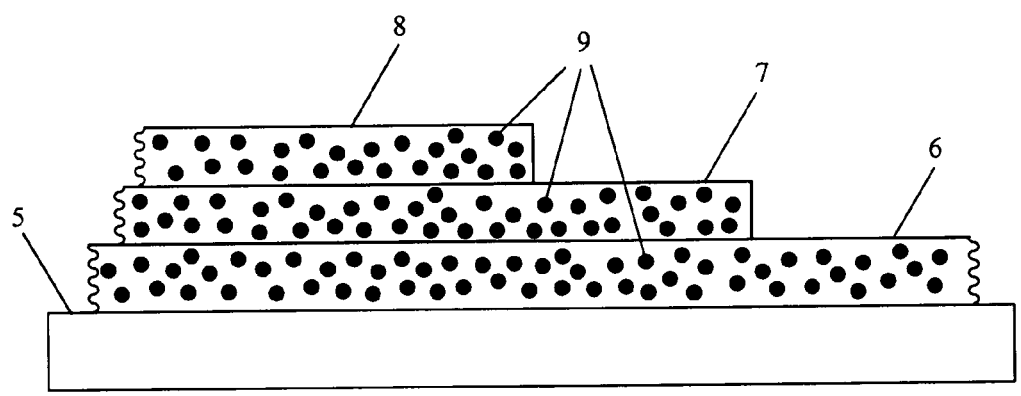

FIG. 2 shows a cross section of an article of the present invention in which substrate 5 is coated with three layers of clear coating: layer 6, layer 7, and layer 8. Beads 9 are shown dispersed in the coatings. The size of the beads have been enlarged in the drawings for clarity. A portion of layer 6 is not covered by any other layer of clear coating. Layer 7 lies on top of layer 6, and some a portion of layer 7 is not covered by any other layer of clear coating. Layer 8 lies on top of layer 7.

Figure 3:
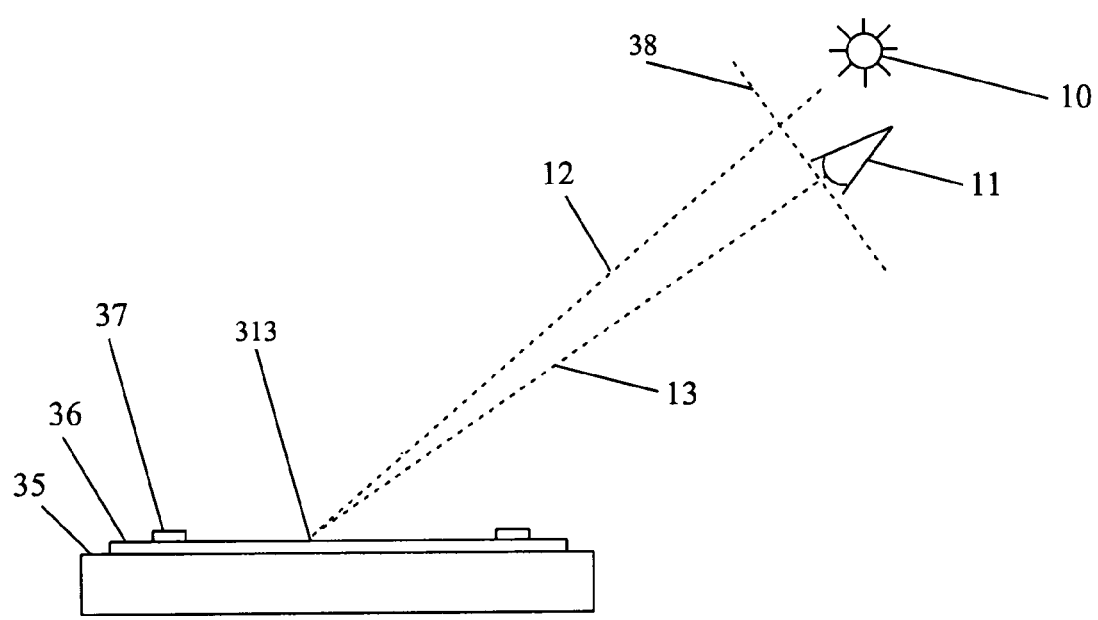

FIG. 3 shows a cross section of an article of the present invention comprising substrate 35, a layer of clear coating 36, and a discontinuous layer of clear coating 37, which lies on top of layer 36. Point 313 is the center of the article. A non-extended light source 10 is shown, and the observation point 11 is shown. An imaginary line 12 connects center point 313 to the light source 10. An imaginary line 13 connects center point 313 to the observation point 11. An imaginary line 38 is perpendicular to line 13, and line 38 intersects line 12.

Figure 4:
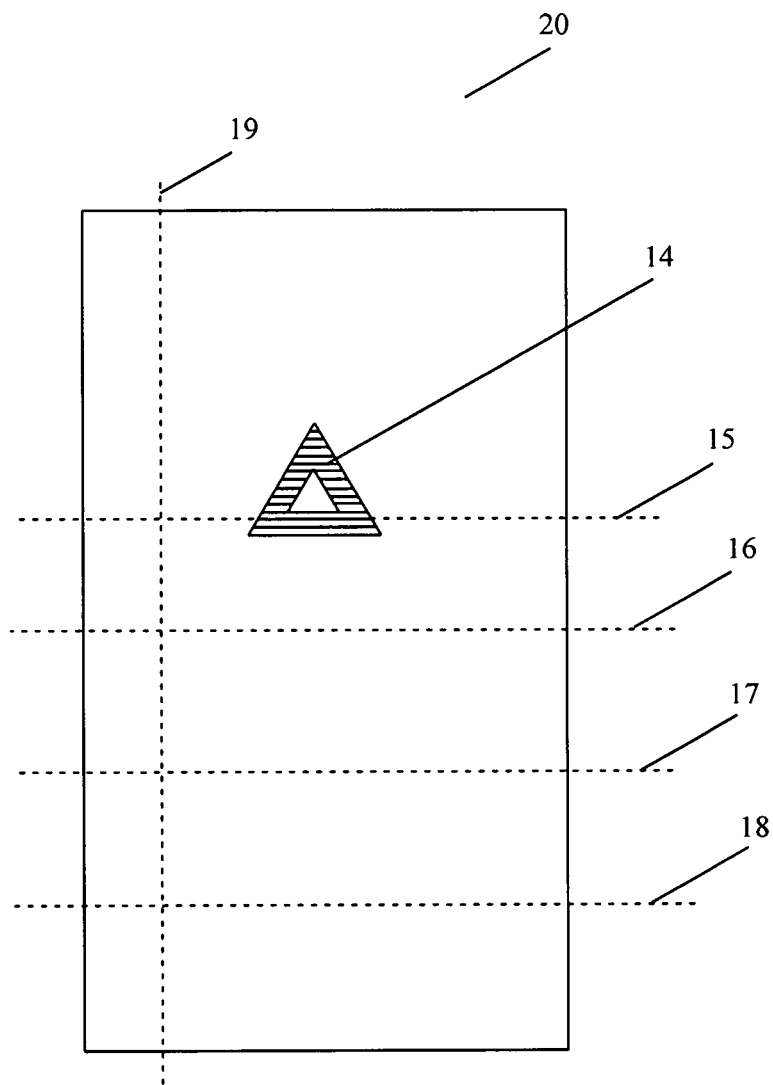

FIG. 4 shows an overhead view of an article of the present invention 20. FIG. 4 shows the configuration of the article described herein below in Example 1. A layer of clear coating 14 is applied to the substrate in the shape of a triangle having relatively thick sides and an un-coated interior. Then a clear coating is applied to the entire top surface of the substrate, including covering layer 14. Then a clear coating is applied top of that, bounded by the left and right sides of the substrate, the bottom edge of the substrate, and imaginary line 15. Then a clear coating is applied top of that, bounded by the left and right sides of the substrate, the bottom edge of the substrate, and imaginary line 16. Then a clear coating is applied top of that, bounded by the left and right sides of the substrate, the bottom edge of the substrate, and imaginary line 17. Then a clear coating is applied top of that, bounded by the left and right sides of the substrate, the bottom edge of the substrate, and imaginary line 18. Imaginary line 19 is the line along which the cross section in FIG. 5 is shown.

Figure 5:
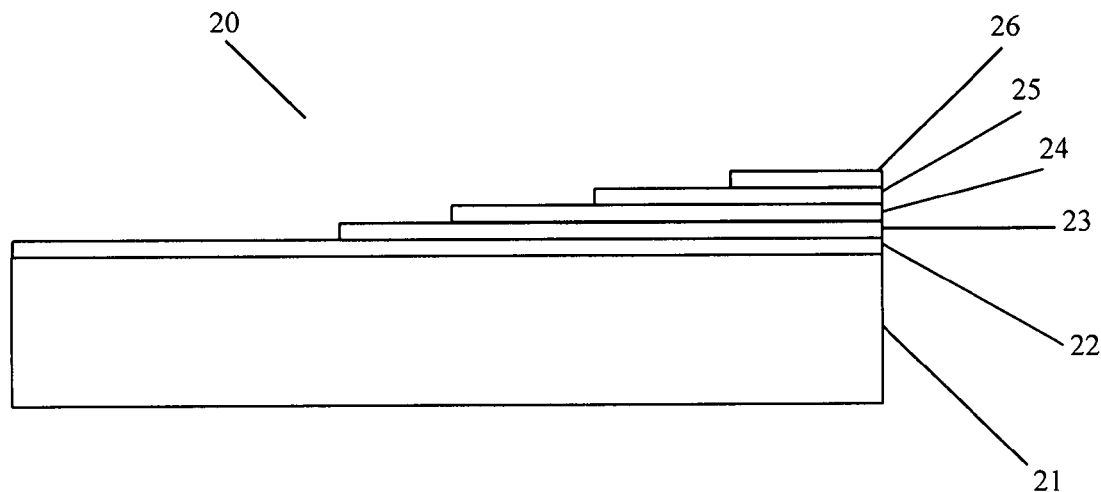
Figure 6:
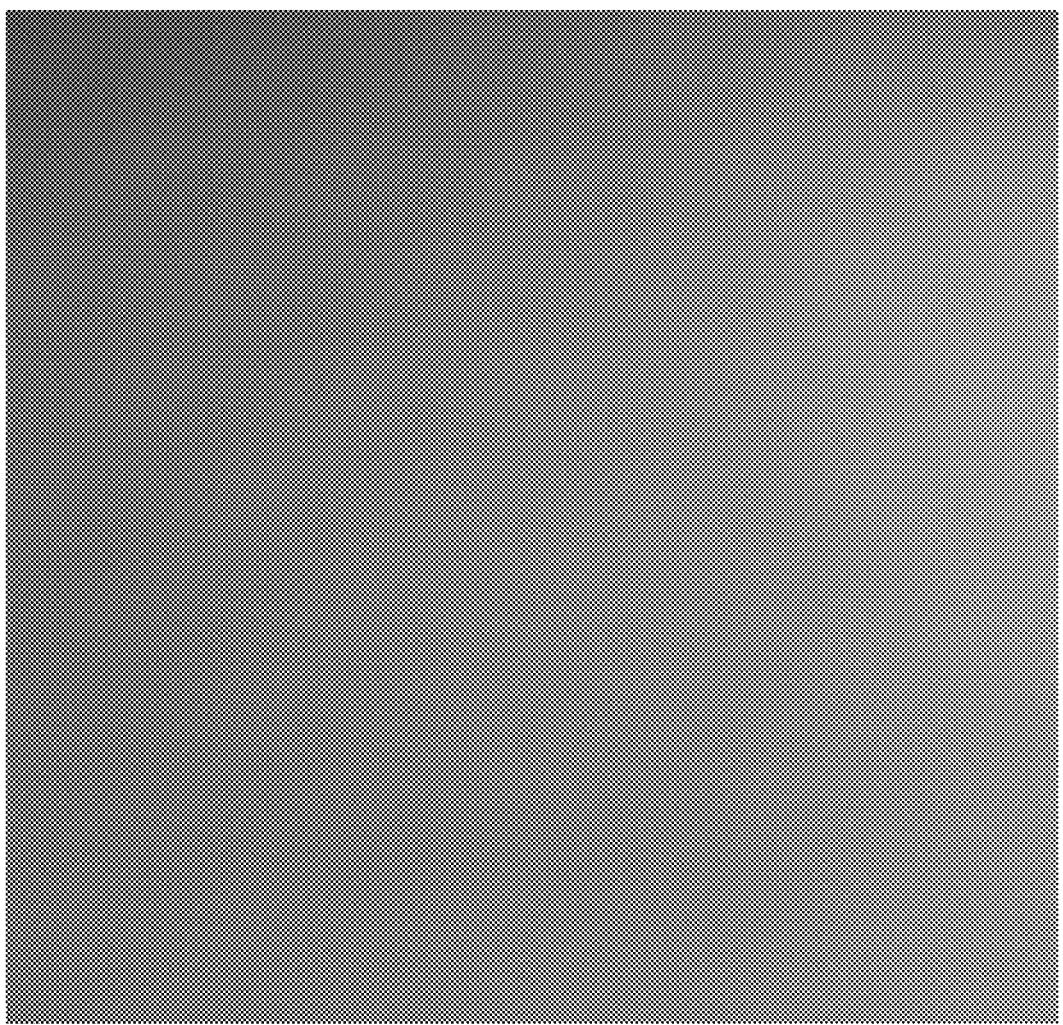
Figure 7:
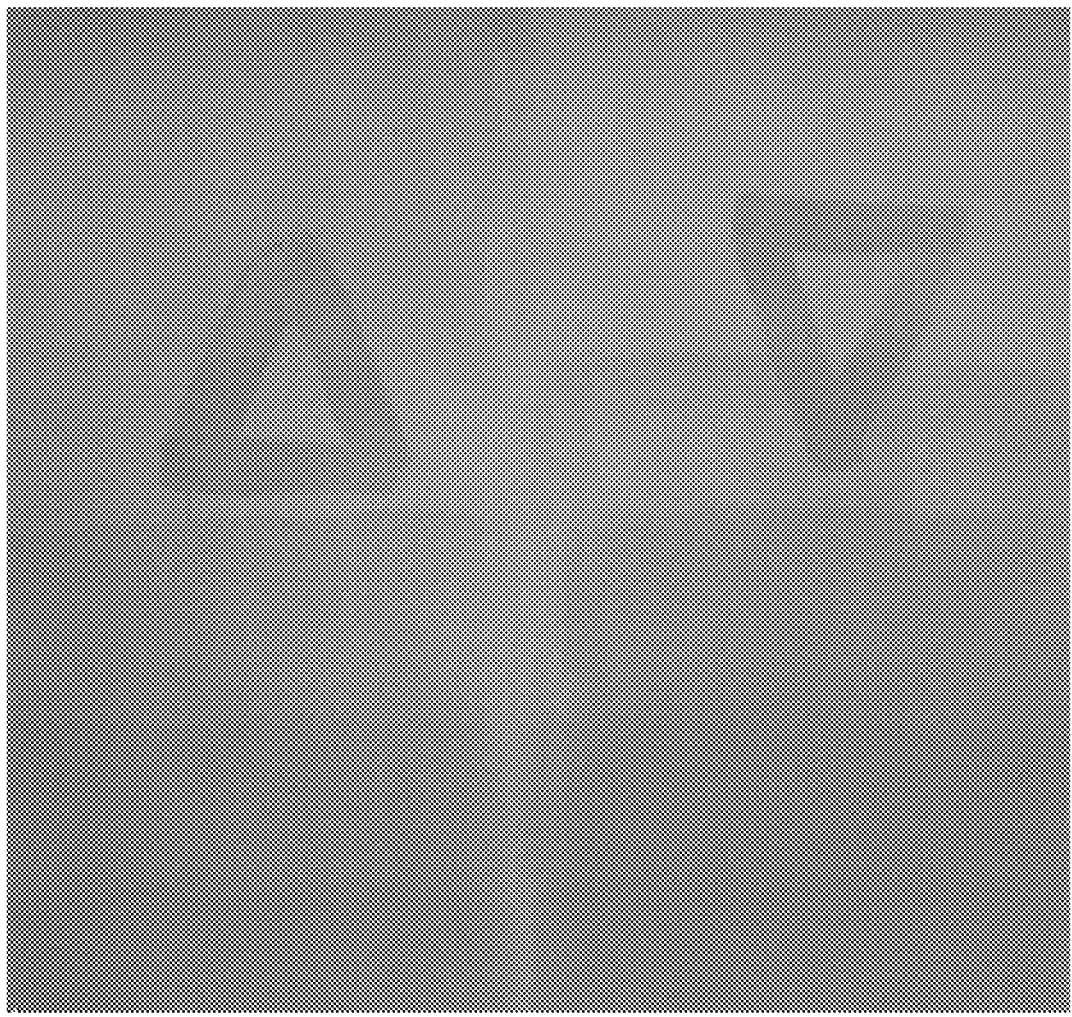
Figure 8:
Figure 9:
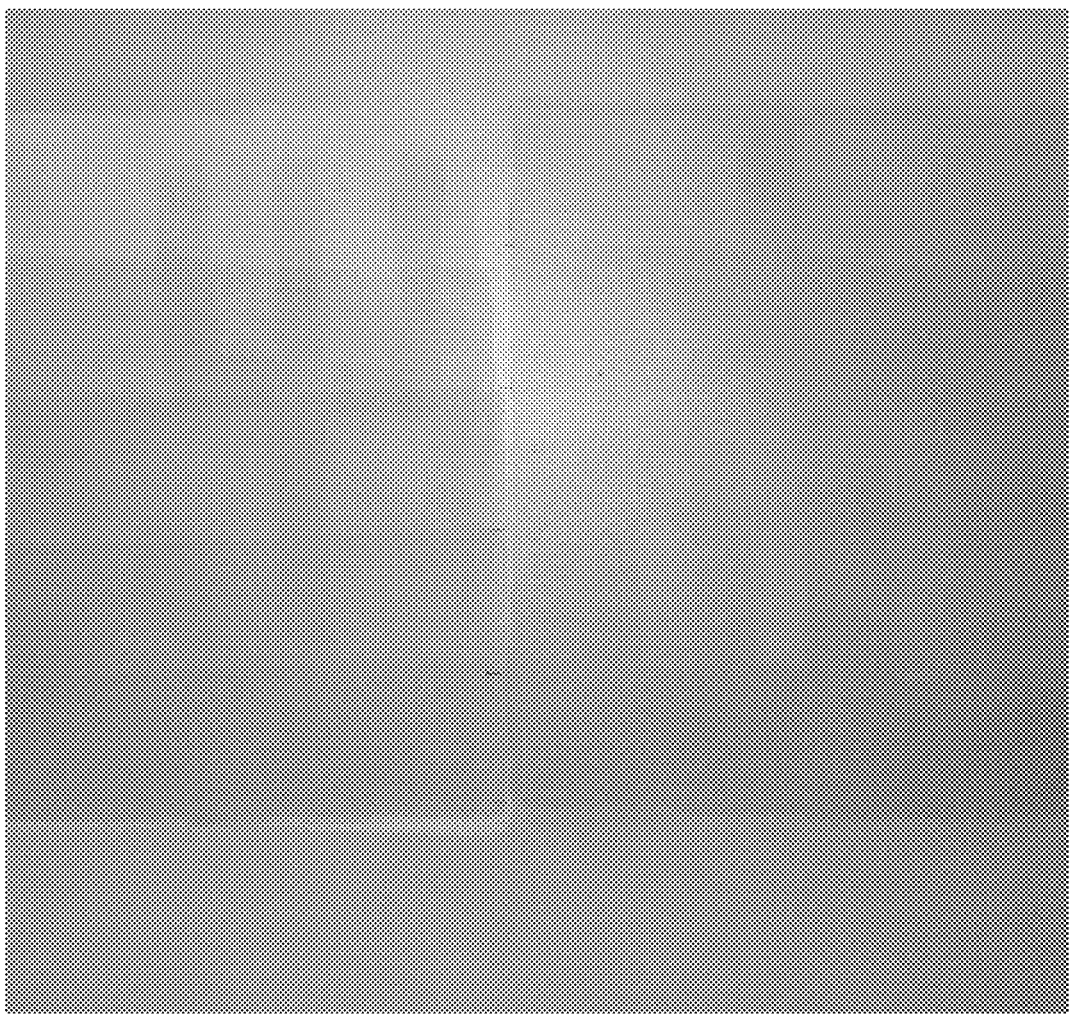
Figure 10:
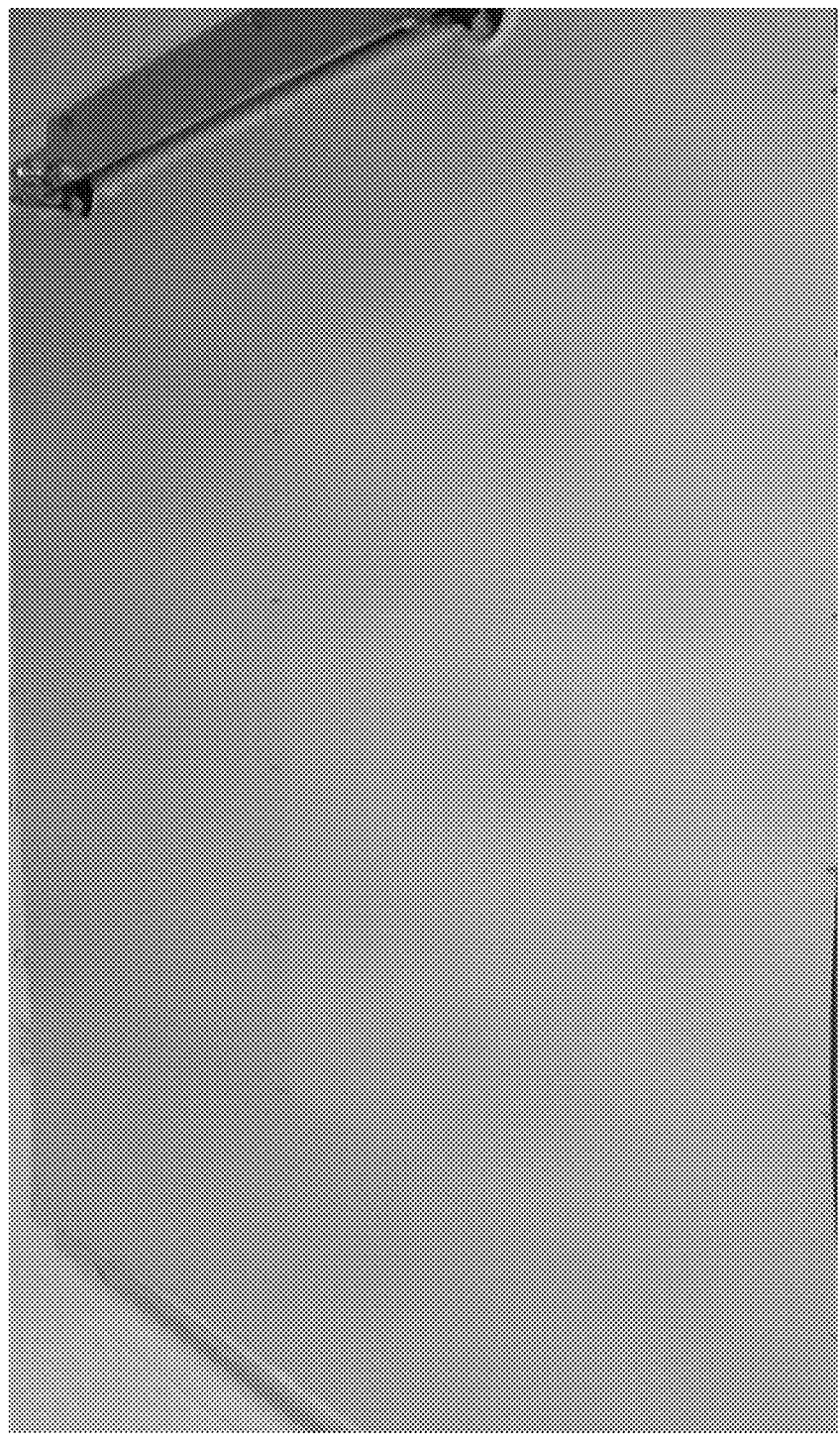
Figure 11:

FIG. 5 is a cross section of article 20, the overhead view of which is shown in FIG. 4. Shown are substrate 21 and successive layers of clear coating: layer 21, layer 22, layer 23, layer 24, layer 25, and layer 26.

FIGS. 6-11 are photographs of the coated substrates described in the Examples section herein below. Formulations ("Form") A, B, and C are made according to the present invention; formulation C-CC is comparative. Light source was either diffuse or the flash unit on the camera.

| Figure | side | Form | Light | Angle | Comment |
|---|---|---|---|---|---|
| 6 | left | A | diffuse | normal | no image is visible |
| 6 | right | B | diffuse | normal | no image is visible |
| 7 | left | A | flash | normal | image is visible |
| 7 | right | B | flash | normal | image is visible |
| 8 | left | C | diffuse | normal | no image is visible |
| 8 | right | C-CC | diffuse | normal | image is visible |
| 9 | left | C | flash | normal | image is visible |
| 9 | right | C-CC | flash | normal | image is visible |
| 10 | left | C | diffuse | 85° | no image is visible |
| 10 | right | C-CC | diffuse | 85° | image is visible |
| 11 | left | C | flash | 85° | image is visible |
| 11 | right | C-CC | flash | 85° | image is visible |

The following is a detailed description of the invention.

As used herein, the following terms have the designated definitions, unless the context clearly indicates otherwise.

A "coating composition" is a liquid composition that is designed to be applied as a layer on the surface of a substrate. Coating compositions contain a continuous liquid medium in which one or more additional ingredients are dissolved or dispersed. After a layer of a coating composition is applied to a surface, the liquid medium is evaporated or allowed to evaporate, and the remaining ingredients are said to form a "coating" on the surface. Coating compositions contain one or more binder; a binder is a composition that forms a solid that adheres to the surface of the substrate and that adheres to other ingredients in the coating.

A composition is said herein to be a liquid if it is in the liquid state at 25° C.

A coating is said herein to be "clear" if the coating meets the following criterion: An opaque substrate is identified and measured by the CIE-L*A*B* assessment using integrating sphere D65-10° observer, specular reflectance excluded conditions (ASTM D2244-11). The L*, a*, and b* values of the substrate are LS*, aS*, and bS*, respectively. Then the coating is applied to the substrate and the L*, a*, and b* values measured again, and the results are LC*, aC*, and bC*. The coating is said to be clear if Delta-E is less than 2.0, where Delta-E=SQRT((LS*−LC*)²+(aS*−aC*)²+(bS*−bC*)²).

A coating is said herein to be "opaque" if the coating has contrast ratio of greater than 0.2 as measure by ASTM D2805-11 using a 38 micrometer (1.5 mil) bird applicator and Leneta 5C opacity chart.

A "polymer," as used herein is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof. Polymers have weight-average molecular weight of 1,000 or more. A polymer that is fully crosslinked is considered herein to have infinite molecular weight.

As used herein "weight of polymer" means the dry weight of polymer.

Molecules that can react with each other to form the repeat units of a polymer are known herein as "monomers." The repeat units so formed are known herein as "polymerized units" of the monomer.

An organic polymer is a polymer in which all polymerized units are units of monomers that are organic compounds. Organic compounds are compounds that contain carbon atoms except for a relatively small number of carbon compounds that are generally considered to be inorganic. Generally considered to be inorganic are, for example, binary compounds (such as carbon oxides and carbon disulfide), ternary compounds (such as metallic cyanides, metallic carbonyls, phosgene, and carbonyl sulfide), and metallic carbonates (such as calcium carbonate and sodium carbonate).

Vinyl monomers have the structure

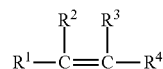

where each of $R^1$, $R^2$, $R^3$, and $R^4$ is, independently, a hydrogen, a halogen, an aliphatic group (such as, for example, an alkyl group), a substituted aliphatic group, an aryl group, a substituted aryl group, another substituted or unsubstituted organic group, or any combination thereof.

Some suitable vinyl monomers include, for example, styrene, substituted styrenes, dienes, ethylene, other alkenes, dienes, ethylene derivatives, and mixtures thereof. Ethylene derivatives include, for example, unsubstituted or substituted versions of the following: ethenyl esters of substituted or unsubstituted alkanoic acids (including, for example, vinyl acetate and vinyl neodecanoate), acrylonitrile, (meth)acrylic acids, (meth)acrylates, (meth)acrylamides, vinyl chloride, halogenated alkenes, and mixtures thereof. As used herein, "(meth)acrylic" means acrylic or methacrylic; "(meth)acrylate" means acrylate or methacrylate; and "(meth)acrylamide" means acrylamide or methacrylamide. "Substituted" means having at least one attached chemical group such as, for example, alkyl group, alkenyl group, vinyl group, hydroxyl group, carboxylic acid group, other functional groups, and combinations thereof. In some embodiments, substituted monomers include, for example, monomers with more than one carbon-carbon double bond, monomers with hydroxyl groups, monomers with other functional groups, and monomers with combinations of functional groups. (Meth)acrylates are substituted and unsubstituted esters or amides of (meth)acrylic acid.

As used herein, acrylic monomers are monomers selected from (meth)acrylic acid, alkyl esters of (meth)acrylic acid, alkyl esters of (meth)acrylic acid having one or more substituent on the alkyl group, (meth)acrylamide, N-substituted (meth)acrylamide, and mixtures thereof. As used herein, vinylaromatic monomers are monomers selected from styrene, alpha-alkyl styrenes, and mixtures thereof.

One class of vinyl monomers are multiethylenically unsaturated monomers, which are monomers having two or more polymerizable carbon-carbon double bonds. Examples of multiethylenically unsaturated monomers are divinyl benzene, allyl(meth)acrylate, and multiacrylate esters of alkylene polyols. Alkylene polyols are alkanes in which two or more hydrogen atoms are replaced with hydroxyl groups. A multiacrylate ester of an alkylene polyol is a compound that has the structure that would be formed if two or more of the hydroxyl groups on the polyol each reacted with acrylic acid or methacrylic acid to form an ester linkage. Multiethylenically unsaturated monomers in which all the carbon-carbon double bonds have equal reactivity toward free radical polymerization are known herein as "crosslinking monomers." Multiethylenically unsaturated monomers in which at least one of the carbon-carbon double bonds has higher reactivity toward free radical polymerization than at least one of the other carbon-carbon double bonds are known herein as "graftlinking monomers."

As used herein, an "acrylic" polymer is a polymer in which 30% or more of the polymerized units are selected from acrylic monomers and also in which 75% or more of the polymerized units are selected from the group consisting of acrylic monomers and vinylaromatic monomers. The percentages are by weight based on the weight of the polymer.

An object is considered herein to be spherical if the object has no aspect ratio that is greater than 1.1 and no aspect ratio that is less than 0.9. A bead is a spherical object that is capable of being dispersed throughout a coating composition. A collection of beads may be characterized by the weight-average diameter (WAD) of the beads in the collection. Also, the uniformity of the distribution of the diameters may be characterized by W20, which is the weight percent of the collection of beads made of beads that have diameter that is greater than 0.8 times WAD and that is less than 1.2 times WAD. Also, the uniformity of the distribution of the diameters may be characterized by W10, which is the weight percent of the collection of beads made of beads that have diameter that is greater than 0.9 times WAD and that is less than 1.1 times WAD. The weight-average diameter is measured by Disc Centrifuge Photosedimentometry, using the following conditions: The instrument is a Photosedimentometer ("DCP") (CPS Instruments, Inc.) that separates modes by centrifugation and sedimentation through a sucrose gradient. The samples are prepared by adding 1-2 drops into 10 cc DI water containing 0.1% sodium lauryl sulfate. A volume of 0.1 cc of the sample is injected into the spinning disc filled with 15 cc. sucrose gradient. Samples are analyzed relative to a polystyrene calibration standard. Specific conditions are: sucrose gradient 2-8%; disc speed 10,000 rpm; calibration standard is 895 nm diameter polystyrene.

A liquid is said herein to be "aqueous" if it contains 50% or more water by weight based on the weight of the liquid.

When a ratio is said herein to be X:1 or greater, it is meant that the ratio is Y:1, where Y is greater than or equal to X. For example, if a ratio is said to be 3:1 or greater, that ratio may be 3:1 or 5:1 or 100:1 but may not be 2:1. Similarly, when ratio is said herein to be W:1 or less, it is meant that the ratio is Z:1, where Z is less than or equal to W. For example, if a ratio is said to be 15:1 or less, that ratio may be 15:1 or 10:1 or 0.1:1 but may not be 20:1.

The present invention involves one or more layers of a clear coating on the surface of a substrate. The clear coating contains spherical beads. Preferably, the beads are distributed throughout the coating. Beads are solid at 25° C. Preferably, beads do not contain any voids. The normal free volume that exists among polymer chains is not considered herein to constitute any voids. A void as used herein is a volume with a bead that does not contain any polymer and that has volume of 1 nm$^3$ or more. Preferably, beads do not contain any volume regions in which polymer is swollen with any solvent or solution such that the ratio of the volume of the swollen polymer to the volume of that same portion of polymer in its non-swollen state is 1.2:1 or higher.

The beads comprise organic polymer. Preferably, each bead contains an amount of organic polymer, by weight based on the weight of the bead, that is 80% or more; or 90% or more; or 95% or more. For the composition of the bead, preferred polymers are polyurethanes, polyolefins, polydienes, polyesters, polyolefin/acrylic copolymers, acrylic polymers, polystyrene, crosslinked versions thereof, copolymers thereof, and mixtures thereof. More preferred are polyurethanes and acrylic polymers; more preferred are acrylic polymers. Among acrylic polymers, preferred are those in which the content of polymerized units of acrylic monomers is 60% or more; more preferably 75% or more; more preferably 90% or more.

Some beads have homogeneous index of refraction, which means that the index of refraction is the same throughout the volume of the bead. Other beads have inhomogeneous index of refraction, which means that different volume portions of the bead have different indices of refraction. Some inhomogeneous beads are called gradient index ("GRIN") beads; in a GRIN bead, the values of the index of refraction are distributed with spherical symmetry about the center of the bead, and the index of refraction changes monotonically (either increasing or decreasing, and either continuously or stepwise or a combination thereof) from the center of the bead to the outer surface.

Preferred are GRIN beads. Among GRIN beads, preferably, the index of refraction is lower at the center of the bead than at the outer surface. Among GRIN beads, preferably the difference between the highest index of refraction and the lowest is 0.005 or more; more preferably 0.01 or more. Among GRIN beads, preferably the difference between the highest index of refraction and the lowest is 0.1 or less; more preferably 0.06 or less; more preferably 0.02 or less.

Preferably, the bead has a K value of less than 500 kg-force per square meter at full compression. Preferably, the bead has a K value of less than 1.9 N/m$^2$ when measured at 10% compression, preferably a K-value of less than 1.9 N/m$^2$ for K10 and a ratio of K0/K10 (K0=full compression) of greater than 1.5, preferably greater than 3 when measured at a compression rate of 0.79 gram-force/second. K value is defined in "Investigation for Surface Morphology and Mechanical Property Variations of Single Polymer Particles", Journal of Applied Polymer Science Volume 104 (4) 2007, Dong Ok Kim, Jeong Hee Jin)s Preferably the beads have weight-average diameter of 0.5 micrometers or higher; more preferably 1 micrometer or higher; more preferably 2 micrometers or higher. Preferably the beads have weight-average diameter of 50 micrometer or lower; more preferably 20 micrometer or lower; more preferably 10 micrometer or lower.

Preferably the W20 of the beads is 80% or higher; more preferably 90% or higher; more preferably 95% or higher. Preferably the W10 of the beads is 75% or higher; more preferably 80% or higher; more preferably 85% or higher.

Preferred GRIN beads are core/shell polymer particles, in which a polymer core of one composition is surrounded by a polymer shell of a different composition. Core/shell polymer particles may optionally have one or more additional shells surrounding the previous shell or shells. Preferably, core/shell polymer particles are formed by performing a polymerization process to form spherical particles of the core composition, and then, in the presence of those spherical core particles, performing a polymerization process to form the shell composition surrounding those spherical core particles.

The preferred method of making GRIN beads is aqueous emulsion polymerization.

In core/shell particles, preferably, the amount of core, by weight based on the weight of the core/shell particle, is 40% or more, more preferably 60% or more; more preferably 70% or more.

The core is preferably prepared by polymerization or copolymerization of one or more vinyl monomers. Preferred monomers for the preparation of the core are one or more dienes, one or more (meth)acrylates, styrene, one or more substituted styrene, one or more multiethylenically unsaturated monomers, and mixtures thereof; more preferred are one or more alkyl esters of acrylic acid, one or more graftlinking monomers, and mixtures thereof. Preferred alkyl esters of acrylic acid are those in which the alkyl group has 2 to 8 carbon atoms; more preferred is butyl acrylate. Among graftlinking monomers, preferred are one or more of allyl methacrylate, diallyl maleate, allyl acryloxypropionate, and mixtures thereof; more preferred is allyl methacrylate. Preferably, the amount of multiethylenically unsaturated monomer in the core is, by weight based on the weight of the core, 1% or more; more preferably 2% or more. Preferably, the amount of multiethylenically unsaturated monomer is, by weight based on the weight of the core, 50% or less; more preferably 20% or less; more preferably 10% or less; more preferably 6% or less. Preferably, the core contains graftlinker but does not contain crosslinker. Preferably, the monomers used for making the core do not contain any monomers that have an aromatic ring.

The preferred technique for making the core involves preparing uniformly sized small particles by emulsion polymerizing at least one monomer component of the core polymer to form emulsion polymer particles, swelling the emulsion polymer particles with one or more monomer components of the core polymer, and polymerizing the monomer within the emulsion polymer particles. The swelling and polymerizing steps may be repeated until the particles have grown to the desired core size. A preferred procedure for making the core involves emulsion polymerizing the initial emulsion polymer particles using conditions which restrict the molecular weight of the polymer that forms, such as by including chain-transfer moderators, e.g., mercaptans, in the polymerization mixture, such that the resulting emulsion particles comprise an easily swellable oligomer. This process may be varied by preparing the initial emulsion polymer particles in the absence of such limiting of the polymer molecular weight, but subsequently conducting one or more of the swelling and polymerizing steps using the conditions which restrict the polymer molecular weight. Preferably, at least the final polymerization of the core is carried out under conditions which do not so limit the polymer molecular weight.

The shell is preferably prepared by polymerization or copolymerization of one or more vinyl monomers in the presence of the core polymer. Preferred monomers for the preparation of the shell are one or more dienes, one or more (meth)acrylates, styrene, one or more substituted styrene, one or more multiethylenically unsaturated monomers, and mixtures thereof; more preferred are one or more alkyl esters of acrylic acid, one or more alkyl esters of methacrylic acid, and mixtures thereof. Preferred alkyl esters of acrylic acid are those in which the alkyl group has 1 to 4 carbon atoms. Preferred alkyl esters of methacrylic acid are those in which the alkyl group has 1 to 4 carbon atoms; more preferred is 1 or two carbon atoms. Preferably, the amount of multiethylenically unsaturated monomer is, by weight based on the weight of the shell, 5% or less; more preferably 2% or less; more preferably 1% or less; more preferably zero. Preferably, the monomers used for making the shell contain one or more alkyl esters of acrylic acid and one or more alkyl esters of methacrylic acid. Preferably, the monomers used for making the shell do not contain any monomers that have an aromatic ring.

Preferably the clear coating comprises a binder. Preferably, the absolute value of the difference between the index of refraction of the binder and the index of refraction of the beads is 0.001 or greater. Preferably, the absolute value of the difference between the index of refraction of the binder and the index of refraction of the beads is 0.05 or less; more preferably 0.02 or less; more preferably 0.01 or less. For the purpose of calculating the difference between the index of refraction of the bead and the index of refraction of the binder, if the bead is inhomogeneous, the index of refraction of the bead is assumed to be the index of refraction of the portion of the bead closest to the surface of the bead.

Preferably, the binder forms a continuous solid matrix, and the beads are preferably distributed throughout that matrix.

Preferred binders are organic polymers; more preferred are acrylic polymers.

Preferably, the weight ratio of binder to beads is 0.43:1 or greater; more preferably 0.54:1 or greater; more preferably 0.67:1 or greater; more preferably 0.82:1 or greater; more preferably 0.9:1 or greater. Preferably, the weight ratio of binder to beads is 2.33:1 or lower; more preferably 1.86:1 or lower; more preferably 1.5:1 or lower; more preferably 1.22:1 or lower; more preferably 1.1:1 or lower.

A clear coating has Delta-E values over an opaque substrate (as defined above) of less than 2.0. Preferably the clear coating has Delta-E value of less than 1.0, more preferably less than 0.5.

The article of the present invention has different areas in which there are different thicknesses of clear coating. In particular, there is a first area in which the total thickness of all layers of clear coating is T1, and there is a second area in which the total thickness of all layers of clear coating is T2. It is contemplated that other areas of the article may have other thicknesses, and some areas of the article may be the surface of the substrate without any clear coating. The ratio of the absolute value of the difference between T1 and T2 to the weight-average diameter of all the beads in all the layers of the first area and the second area is 1:1 or higher; more preferably 1.001:1; more preferably 2:1 or higher; more preferably 5:1 or higher.

Under the correct viewing conditions, the first area and the second area will appear different from each other. For example, one area may appear to be darker than the other. This difference is the "image" produced by the article of the present invention. For example, if one area were in the shape of a letter or a number, then the image would have meaning for the observer.

The substrate may be any material. The substrate may be opaque, partially transparent, or transparent. The substrate is preferably opaque, which means that 1% or less of the light that strikes the substrate passes through the substrate and emerges on the other side of the substrate.

In some embodiments, the substrate comprises an under-substrate that is coated with an opaque coating. The opaque coating may be, for example, a conventional coating. The opaque coating may be white or may be any color including black. Preferred opaque coatings contain mineral pigment. Preferred opaque coatings score at least 0.70 on the contrast ratio (ASTM D2805-11) opacity test. Suitable under-substrates include, for example, woven or nonwoven fabric, leather, paper, paperboard, cardboard, wood, metal, wallboard, plastic, glass or another material that can be coated. When the substrate comprises an under-substrate coated with an opaque coating, the layers of clear coating are preferably applied to the surface of the opaque coating.

The article of the present invention may be produced by any method. Preferably, two or more layers of clear coating compositions are applied to the surface of the substrate. Preferably, different layers are applied to different application areas of the substrate, with some of the application areas overlapping or coinciding, so that the required difference in total thickness is created.

When two or more layers of clear coating are applied, the composition of each layer may be the same as the composition of one or more of the other layers, or all the layers may be different compositions from all the other layers. It is preferable that the compositions of all layers be the same as one another.

Clear coating compositions may be any type of liquid coating compositions. Preferred coating compositions contain a liquid medium in which the beads are dispersed. The liquid medium may be an aqueous liquid medium or a non-aqueous liquid medium. Non-aqueous media may contain one or more organic solvent, optionally mixed with water. Preferred liquid media are aqueous liquid media; liquid coating compositions in which the liquid medium is aqueous are referred to herein as aqueous coating compositions. Among aqueous liquid media, preferred are those in which the amount of water, by weight based on the weight of the liquid medium, is 50% or more; more preferably 60% or more; more preferably 70% or more; more preferably 80% or more, more preferably 90% or more.

Preferred liquid clear coating compositions contain one or more coating adjuvant in addition to binder and beads. Preferred adjuvants are surfactants, dispersants, coalescents, crosslinking agents, coupling agents, and thickeners. Most preferred adjuvants are siloxane coupling agents. Preferred siloxane coupling agents are aminosilane coupling agents. When coupling agents are used, the amount of coupling agent is preferably 0.1-1% aminosilane coupling agents by weight based on the weight of the total composition.

Among aqueous clear coating compositions, preferred are those in which the binder is in the form of a polymer latex that forms a film at 25° C. That is, after a layer of the aqueous clear coating is applied to the surface of the substrate, the water evaporates, and as the water evaporates, the polymer latex particles preferably fuse to form a binder throughout which the beads are dispersed. One or more coalescents may be present to aid in the process of film formation.

Preferably, the binder contains a polymer that has a glass transition temperature (Tg), as measured by differential scanning calorimetry at 10° C./minute using the midpoint method, of −60° C. to 30° C. In some embodiments, the binder contains a polymer having Tg of −40° C. to −1° C. Preferably, the binder contains a polymer having Tg of 0° C. to 30° C.; more preferably 15° C. to 30° C.

It is useful to characterize the solids content of the clear coating composition. As used herein, solids content is the sum of the weight of binder polymer solids plus the weight of bead solids, divided by the weight of the composition, expressed as a percentage. Preferably, the solids content of the clear coating composition is 25% to 60%.

Preferably, when a layer of a clear coating composition is applied to a surface and dries to form a clear coating, the thickness of that clear coating is 150 micrometers or less; more preferably 100 micrometers or less; more preferably 75 micrometers or less. Preferably, when a layer of a clear coating composition is applied to a surface and dries to form a clear coating, the ratio of the thickness of that clear coating to the weight-average diameter of the beads in that coating is 1:1 or greater; more preferably 2:1 or greater; more preferably 5:1 or greater.

Layers of coating composition may be applied to the substrate in any order, by any method. Preferably, a first layer (labeled herein "LB") of a first coating composition (labeled herein "CB") is applied to the surface of the substrate over an area (herein labeled "AB"). The area AB may be contiguous (for example, an unbroken layer over the entire surface of the substrate) or may be a collection of discontinuous regions (such as, for example, the shapes of one or more letters and/or numbers). Preferably, that layer LB is dried or allowed to dry, and the layer LB forms a clear coating.

Preferably, after layer LB is dry, a second layer ("LC") of a second coating composition ("CC") is applied to an area ("AC") of the substrate. The area AC may be contiguous (for example, an unbroken layer over the entire surface of the substrate) or may be a collection of discontinuous regions (such as, for example, the shapes of one or more letters and/or numbers). Preferably, that layer LC is dried or allowed to dry, and the layer LC forms a clear coating. Preferably, the composition CC is identical to the composition CB.

Preferably, area AC overlaps area AC. The term "overlap" is used herein to mean that some or all of area AC lies on top of some or all of area AB. For example, any of the following embodiments or combinations thereof are envisioned: (1) AC is smaller than AB, and AC lies completely within AB; (2) AC covers part of AB but not all of AB, and some of AC lies outside the boundary of AB; and (3) AC is larger than AB and completely covers all of AB. Each of embodiments (1), (2), and (3) results in at least one area that has just one layer of clear coating and at least one other area that has two layers of clear coating.

Optionally, one or more additional clear coating compositions may be applied and dried. Such additional clear coating compositions, if applied, may be applied before application of coating composition CB or after application of coating composition CC or both.

Preferably, whenever it is intended to apply a subsequent layer of clear coating over a previously-applied clear coating, the previously-applied layer of clear coating composition is dried or allowed to dry prior to applying the subsequent layer of clear coating composition.

Preferably, each clear coating is applied by ordinary coating techniques. Preferred techniques include spraying, mechanical coaters, brushing by hand-held brush, rolling with a hand-held roller, and combinations thereof. More preferred are brushing by hand-held brush, rolling with a hand-held roller, and combinations thereof.

When all of the coating compositions have been applied to the substrate and dried, there will be various areas of the substrate having various thicknesses of clear coating. There will be an area "A1" in which the total thickness of all the clear coatings is "T1." There will be an area "A2" in which the total thickness of all the clear coatings is "T2." Areas A1 and A2 may be chosen independently of areas AB and AC. It will be possible to find at least one pair of areas A1 and A2 that have the characteristic that the difference T1−T2 is greater than the weight average diameter of the plurality of beads. Preferably, the ratio of T1−T2 to the weight-average diameter of the plurality of beads is 2:1 or higher; more preferably 5:1 or higher; more preferably 10:1 or higher.

In order to observe the image, the article of the present invention is preferably observed as follows.

The surface of the article is illuminated with a single, non-extended light source. A non-extended light source is a light source that has no dimension larger than 10 cm. Preferred light sources have no dimension larger than 5 cm, more preferably no dimension larger than 2 cm. Preferably, most or all of the light falling on the article comes directly from the single light source. Preferably, the ratio of light energy coming directly from the light source to the light energy coming from all other sources (including light from the single light source that reflects off of other surfaces and then falls on the article of the present invention) is 10:1 or higher; more preferably 100:1 or higher.

It is useful to characterize the location of the light source relative to the article of the present invention. The point "O" is determined as the center of the surface of the article of the present invention. To determine the location of point O, the area of the surface of the substrate that has one or more layer of clear coating is observed and is referred to as the "coated area." The center of the coated area is then found. If the coated area is an irregular shape, an object is imagined that is very thin and rigid and that has the same shape as the coated area; the center of mass of that imagined object gives the location of the center of the coated area. A line is imagined that connects point O with the center of the light source, and that line is labeled herein as line "L1." As used herein, a "line" is straight and not curved.

The location of the observation point is also determined A line "L2" is imagined that connects point O with the observation point. A line "L3" is imagined that is perpendicular to line L2 and that intersects line L1 at point P. It is noted that line L1 is considered to be infinite in length, so it is possible to determine point P, regardless of whether the distance from the illumination source to point O is smaller than, larger than, or equal to the distance from the observation point to point O. The Observation/Illumination Separation distance ("OIS distance") is defined herein as the length of the line segment from the intersection of lines L2 and L3 to point P. Preferably, the OIS distance is 15 cm or less; more preferably 10 cm or less; more preferably 5 cm or less.

It is also useful to characterize the angle between L1 and L2, which is defined herein as the angle at point O between the line segment that starts at point O and ends at the light source and the line segment that starts at point O and ends at the observation point. The angle between line L1 and line L2 is preferably 10 degrees or less; more preferably 5 degrees or less.

Location of the light source and the observation point are illustrated in FIG. 3. Point O is item 13; line L1 is item 12, line L2 is item 13, and Line L3 is item 38. Point P is the intersection between item 12 and item 38.

One suitable method of viewing the object is to take a photograph using a camera that has a built-in flash unit. Such a photo is preferably taken under low ambient light conditions, with the principal source of illumination being the flash unit attached to the camera. For such photography, preferred are compact cameras in which the flash unit and the lens are both mounted on the front surface of the camera. Preferably, the distance from the center of the face of the camera lens to the center of the face of the flash unit is 5 cm or less.

Preferably, the image in the article is not apparent when observation is made in diffuse lighting conditions. Preferably, the image in the article is not apparent under any conditions of lighting outside of those herein described as preferred. Preferably, the image in the article is not apparent under any observation conditions outside of those herein described as preferred.

Embodiments are envisioned in which the substrate is a transparent sheet such as, for example, a pane of glass or a sheet of clear plastic. Among such embodiments, the source of illumination may be on one side of the sheet and the observation point may be on the other side of the sheet. In such embodiments, there is an angle at point O between two line segments: the line segment from the point O to the point of observation, and the line segment from point O to the source of illumination. In such embodiments, it is contemplated that the angle at point O must be 180° or lower; the angle at point O is preferably 170° to 180°; more preferably 175° to 180°. Among such embodiments, it is envisioned that an image could be formed of the point of observation onto a digital imaging device such as a charge-coupled device chip; the image could be continuously monitored electronically, and an event such as an alarm could be triggered if there were any change in the image; such an embodiment would provide detection for any movement of the article, any obstruction in the path of the light, or the occurrence of a high level of diffuse illumination.

The following are examples of the present invention.

The following ingredients were used in the following examples.

| Item | Description | Source |
| --- | --- | --- |
| BA | butyl acrylate | |
| MMA | methyl methacrylate | |
| ALMA | allyl methacrylate | |
| n-DDM | n-dodecylmercaptan | |

-continued

| Item | Description | Source |
|---|---|---|
| PU bead | Adimatt ™ 8FT polyurethane beads, weight-average diameter 8 micrometers; uniform index of refraction 1.51 | Supercolori S.p.A. |
| MMA bead | Sun ™ PMMA S-550 acrylic beads, weight-average diameter 5 micrometers, uniform index of refraction 1.49 | Sunjin |
| GRIN bead | Gradient Index bead, described below | |
| Silicate | Laponite ™ RD synthetic layered silicate; swells in water to give a clear dispersion | Rockwood Additives Limited |
| Binder | Rhoplex ™ VSR-50[1], acrylic latex, 45% to 50% solids by weight | Dow Chemical Corporation |
| defoamer | Byk ™-028 defoamer, polysiloxanes and hydrophobic solids in polyglycol | Byk-Chemie GmbH |
| thickener1 | Acrysol ™ RM-2020 urethane rheology modifier | Dow Chemical Company |
| thickener2 | Acrysol ™ RM-8W urethane rheology modifier | Dow Chemical Company |
| thickener3 | Acrysol ™ ASE-60 rheology modifier | Dow Chemical Company |
| surfactant | Tergitol ™ 15-s-20 surfactant, secondary alcohol ethoxylate | Dow Chemical Company |
| silica | Imsil ™ A-25, microcrystalline silica filler | Cary Company |
| calcium carbonate | Omyacarb ™ 5 particulate calcium carbonate | Omya |
| dispersant | Tamol ™ 731a hydrophobially modified dispersant | Dow Chemical Company |
| ammonia | 18 molar solution in water | |
| interior paint | Kilz Pro-X ™ 330 interior eggshell paint, dark base PX335 | Masterchem Industries |

Note
[1]: measured refractive index of dry binder film was 1.4837 at 20.5° C.

GRIN beads were core/shell acrylic latex polymers. Core index of refraction was 1.46, shell index of refraction 1.49. The latex was prepared as follows.

Sample b. Formation of seed polymer for use in preparing particulate polymer.

TABLE b.1

Reaction mixtures used in Sample b synthesis

| Material | Charges Wt. (g) | % Active | Solids Wt. (g) | % Active BOM[1] |
|---|---|---|---|---|
| Kettle Charge: | | | | |
| DI Water | 7425.0 | | | |
| Buffer | | | | |
| Sodium Carbonate | 3.9 | 100.0% | 3.9 | 0.08% |
| DI Water | 100.0 | | | |
| DI Water Rinse | 35.0 | | | |
| Kettle Additive | | | | |
| 50% Methyl-β-cyclodextrin | 97.7 | 50.0% | 48.8 | 1.01% |
| DI Water Rinse | 45.0 | | | |
| Seed | | | | |
| Seed from example 1 | 266.4 | 46.0% | 122.5 | 2.53% |
| DI Water Rinse | 315.0 | | | |
| Initial Catalyst | | | | |
| Ammonium Persulfate | 4.9 | 100.0% | | 0.10% |
| DI water | 50 | | | |
| Kettle Catalyst | | | | |
| Ammonium Persulfate | 4.9 | 100.0% | 4.9 | 0.10% |
| DI Water | 100 | | | |
| Co-feed Catalyst | | | | |
| Ammonium Persulfate | 9.9 | 100.0% | 9.9 | 0.20% |
| DI Water | 450 | | | |

TABLE b.1-continued

Reaction mixtures used in Sample b synthesis

| Material | Charges Wt. (g) | % Active | Solids Wt. (g) | % Active BOM[1] |
|---|---|---|---|---|
| Monomer Emulsion | | | | |
| DI Water | 1075.5 | | | |
| Sodium Dodecyl-benzenesulfonate (23%) | 86.0 | 23.0% | 19.8 | 0.41% |
| BA | 3969.0 | 100.0% | 3969.0 | 81.8% |
| MMA | 873.0 | 100.0% | 873.0 | 18.0% |
| MAA | 9.9 | 100.0% | 9.9 | 0.2% |
| n-DDM Emulsion | | | | |
| DI Water | 1236.7 | | | |
| Sodium Dodecyl-benzenesulfonate (23%) | 42.2 | 23.0% | 9.7 | 0.20% |
| n-DDM | 1067.4 | 100.0% | 1067.4 | 22.0% |
| End Of Feeds Rinses | | | | |
| DI Water (ME) | 180.0 | | | |
| DI Water (n-DDM) | 225.0 | | | |
| DI Water (Co-feed Catalyst) | 45.0 | | | |
| Chaser Promoter | | | | |
| FeSO4•7H20 | 0.26 | 100.00% | 0.3 | 0.005% |
| Versene | 0.36 | 100.00% | 0.7 | 0.015% |
| DI water | 45.0 | | | |
| DI water Rinse | 25.7 | | | |
| Chaser Catalyst #1 | | | | |
| Ammonium Persulfate | 1.53 | 100.0% | 1.5 | 0.03% |
| DI water | 67.5 | | | |
| DI water Rinse | 25.7 | | | |
| Chaser Activator #1 | | | | |
| SSF | 0.95 | 100.0% | 1.0 | 0.02% |
| DI water | 67.5 | | | |
| DI water Rinse | 25.7 | | | |

TABLE b.1-continued

Reaction mixtures used in Sample b synthesis

| Material | Charges Wt. (g) | % Active | Solids Wt. (g) | % Active BOM[(1)] |
|---|---|---|---|---|
| Chaser Catalyst #2 | | | | |
| Ammonium Persulfate | 1.53 | 100.0% | 1.5 | 0.03% |
| DI water | 67.5 | | | |
| DI water Rinse | 25.7 | | | |
| Chaser Activator #2 | | | | |
| SSF | 0.95 | 100.0% | 1.0 | 0.02% |
| DI water | 67.5 | | | |
| DI water Rinse | 25.7 | | | |
| Chaser Catalyst #3 | | | | |
| Ammonium Persulfate | 1.53 | 70.0% | 1.1 | 0.02% |
| DI water | 67.5 | | | |
| DI water Rinse | 25.7 | | | |
| Chaser Activator #3 | | | | |
| SSF | 0.95 | 100.0% | 1.0 | 0.02% |
| DI water | 67.5 | | | |
| DI water Rinse | 25.7 | | | |

Note
[(1)]: % by weight based on the total weight of all monomers

Procedure:

Monomer Emulsion Preparation

Weighed and added the DI water to the emulsion tank. Turned on emulsion tank agitator. Weighed and added the DS-4 to the emulsion tank and agitated for 2 min. Added BA. Added MMA. Added MAA. Agitated for 5 min. Checked for stable monomer emulsion (ME).

n-DDM Emulsion Preparation

In order to get a stable n-DDM emulsion it is necessary to shear the emulsion to very small droplets using a high speed mixer.

Charged 1236.7 g of DI water to a one gallon container. Charged 42.23 g of sodium dodecylbenzenesulfonate (23%) and 1067.4 g of n-DDM to the container in that order. Agitated the mixture until the mixture became very thick and creamy.

Kettle Preparation:

Charged the kettle water to the reactor and heated to 88-90° C. Started agitation and began a 30 min. nitrogen sparge. After 30 min turned off nitrogen sparge. Added buffer. Added kettle additive. Added kettle catalyst. Added Seed. With the kettle at 83-87° C. fed the ME over 240 minutes. Fed the n-DDM emulsion over 235 minutes. Fed the co-feed catalyst over 240 minutes. Controlled the temperature at 83-87° C. during feeds. When the n-DDM emulsion addition was complete, fed rinse over 5 min. When the ME and co-feed catalyst were complete, added rinses. Held the reactor at 83-87° C. for 15 min. Cooled to 70° C. Added chaser promoter and held 15 min. Added chase I and held 15 min at 70° C. Added chase II and held 15 min at 70° C. Added chase III and held 15 min at 70° C. Cooled to 40 C and filtered.

Sample A. Formation of Particulate Polymer

TABLE A.1

Mixtures used in formation of Sample A

| Material | Charges Wt. (g) | % Active | Solids Wt. | % Active BOM |
|---|---|---|---|---|
| Kettle Charge: | | | | |
| DI Water | 7618 | | | |

TABLE A.1-continued

Mixtures used in formation of Sample A

| Material | Charges Wt. (g) | % Active | Solids Wt. | % Active BOM |
|---|---|---|---|---|
| Seed | | | | |
| Oligomer seed Sample b | 66.5 | 33.0% | | 0.41% |
| DI Water (rinse) | 146.3 | | | |
| Monomer Emulsion I | | | | |
| Deionized Water | 2071.9 | | | |
| Sodium Dodecylbenzensulfonate (23%) | 80.8 | 23.0% | 18.6 | 0.35% |
| BA | 5113.0 | 100.0% | 5113.0 | 95.5% |
| α-Methylstyrene | 26.8 | 100.0% | 26.8 | 0.5% |
| ALMA | 214.2 | 100.0% | 214.2 | 4.0% |
| DI Water Rinse | 130.0 | | | |
| Initiator Emulsion | | | | |
| DI Water | 53.7 | 100.0% | | |
| Sodium Dodecylbenzensulfonate (23%) | 1.10 | 23.0% | 0.3 | 0.0038% |
| t-Butyl Per-2-ethylhexanoate (97%) | 24.44 | 97% | 23.7 | 0.36% |
| DI Water (Rinse) | 97.5 | | | |
| Co-feed Catalyst | | | | |
| t-Butyl Hydroperoxide (70%) | 7.02 | 70% | | 0.074% |
| DI Water | 474.5 | | | |
| DI Water (rinse) | 50 | | | |
| Co-feed Activator | | | | |
| IAA | 3.58 | 100.0% | 3.6 | 0.06% |
| DI Water | 474.5 | | | |
| DI Water Rinse) | 50.0 | | | |
| ME II | | | | |
| DI Water | 321.75 | | | |
| Sodium Dodecylbenzensulfonate (23%) | 16.15 | 23.0% | 3.7 | 0.06% |
| MMA | 1229 | 100.0% | 1228.5 | 95.9% |
| EA | 53.17 | 100.0% | 53.2 | 4.1% |
| DI Water Rinse) | 97.5 | | | |
| Stage II Promoter | | | | |
| DI Water | 26.61 | | | |
| FeSO4•7H2O | 0.04 | 100% | 0.04 | 0.00057% |
| Versene | 0.02 | 100% | 0.02 | 0.00024% |
| Chaser Catalyst | | | | |
| t-Butyl Hydroperoxide (70%) | 9.26 | 70.0% | 6.5 | 0.098% |
| DI Water | 344.5 | | 0.0 | |
| DI Water Rinse | 50 | | | |
| Chaser Activator | | | | |
| IAA | 4.68 | 100.0% | 4.7 | 0.071% |
| DI Water | 344.5 | | | |
| DI Water Rinse | 50 | | | |

Procedure:

Added kettle charge to the reactor and heated to 78° C. Turned on agitation. Made up ME I as follows: Added surfactant and water to the ME tank. Slowly stirred in BA, added ALMA. At 78° C., added seed and rinsed water. Started ME I feed at 116.43 g/min. Did not let temperature fall below 63° C. When 1510 grams of ME I had been fed (20% of ME I) stopped ME I and held 30 min. Cooled to 65° C. While cooling made up the initiator emulsion. With the reactor at 65° C., added the initiator emulsion and watched for exotherm. After peak exotherm, allowed the reaction mixture temperature to increase to 83° C. over 10 min. while resuming feeding of ME I through a pipe equipped with rotor stator at 116.43 g/min. When ME I was complete, added rinse. Cooled to 78° C. Made up ME II in the order listed. At 78° C., added stage II promoter (pre-mixed before adding), started co-feed catalyst and activator at 9.5 g/min over 50 min. Started ME II at 37.7 g/min. over 45 min. Maintained 78° C. reaction temperature. When ME II and co-feeds were complete, added rinses. Cooled to 65° C. At 65° C., started chaser catalyst and activator at 8.60 g/min. over 40 min. When the chaser catalyst and activator were complete cooled to 25° C. Filtered to remove any agglomeration. To the final product, thickener 3 was added and the emulsion was neutralized with aqueous ammonia to pH 8.5.

Silicate solution was made by placing 194.6 g deionized water into a 500 ml plastic container; slowly adding 5.4 g Laponite™ RD, and stirring until completely dissolved.

EXAMPLE 1

The following formulations were made: amounts shown are grams.

| number | ingredient | Formulation A | Formulation B | Formulation C |
|---|---|---|---|---|
| 1A | PU bead (38% solids) | 452 | | |
| 1B | MMA bead (100% solids) | | 80.26 | |
| 1C | GRIN bead (33% solids) | | | 400 |
| 2 | silicate solution | 50 | 24 | 45.5 |
| 3 | binder latex | 345.5 | 165.84 | 314.1 |
| 4 | water | 45 | 158.4 | 40.9 |
| 5 | defoamer | 0.55 | 0.26 | 0.5 |
| 6 | texanol | 7.85 | 3.77 | 7.1 |
| 7 | ammonia | 1.35 | 0.65 | 1.2 |
| 8 | thickener1 | 8.55 | 4.10 | 7.8 |
| 9 | thickener2 | 13.32 | 21.52 | 15 |
| 10 | propylene glycol | | 7.20 | |
| 11 | surfactant | | 1.0 | |
| 12 | water | 76.1 | 13.22 | 81.8 |

Characteristics of the formulations were as follows:

| test | Formulation A | Formulation B | Formulation C |
|---|---|---|---|
| weight solids[1] | 52% | 52% | 48 |
| volume solids | 31% | 31% | 31 |
| Krebs viscosity | 103.6 KU | 107.4 KU | 101 KU |
| ICI viscosity | 0.06 Pa*S (0.6 P) | 0.09 Pa*S (0.9 P) | 0.04 Pa*S (0.4 P) |
| pH | 8.42 | 8.67 | 8.70 |

Note
[1]: 100 × (weight of dry binder + weight of dry beads)/(weight of formulation)

To make Formulation A and Formulation C, a laboratory-style top pitch blade stirrer was used in a 1-liter plastic container. Ingredient 1A or 1C was added. While stirring with a vortex, the following were added in order: ingredients number 2, 3, 4, 5, 6, 7, 8, 9, and 12.

To make Formulation B, the same type container and stirrer were used. Ingredients number 2, 4, 10, and 11 were added and stirred. Then, while stirring, ingredient 1B was added. Then, while stirring with a vortex, the following were added in order: ingredients number 3, 5, 6, 7, 8, 9, and 12.

For each sample, a piece of dry wallboard was used, 6.35 mm×60 cm×120 cm. The wallboard was coated with interior paint using a roller of length 228 mm and nap of 9.5 mm (Contractor Series™ roller cover, Sherwin-Williams Co.). The first coat was allowed to dry for at least 3 hours, then a second coat was applied and allowed to dry for at least 3 hours. The resulting painted wallboard was the opaque substrate.

Clear coatings were applied to each sample as follows, as illustrated in FIG. 4 and FIG. 5: A small area of clear coating in the shape of a simple geometric shape was applied using a 38.1 mm brush (Golder Glo™, The Wooster Brush company, Reno, Nev.) and allowed to dry. The geometric shapes were as follows:

Formulation A: triangle as shown in FIG. 4

Formulation B: triangle of same size and shape, with apex pointed down

Formulation C: pitchfork shape, tines pointed up, total length approximately three-quarters of the length of the board Then, using the same clear coating composition each time, multiple layers of clear coating were applied to the substrate, each time using the same type roller (Contractor series™ Microfiber 14 mm nap×228 mm, Sherwin-Williams) A first roll of clear coating composition was applied over the entire board, including rolling over the brush applied clear coating, and the coating composition was allowed to dry. Then, a second roll of clear coating composition was applied over the first roll-applied clear coating, leaving an area of the previous coating un-covered, and the second clear coating composition was allowed to dry. The process was repeated for a third, fourth, and fifth roll of clear coating composition, each time allowing the previous roll of clear coating composition to dry prior to applying the subsequent coating composition, and each time leaving a portion of the previous coating un-covered.

The boards were visually observed. In each of the viewing situations reported here, one of two results was apparent:

"yes"=the geometric figure was readily apparent, and the stair-step pattern from the increasing thick layers of clear coating was also readily apparent, or "no"=the geometric figure was not visible, and no stair-step pattern was visible; the surface of the board appeared uniform.

In a experiment 1-1, the board was held vertically as shown in FIG. 4 and illuminated with diffuse ambient lighting. The board was viewed from three angles: normal to the board, approximately 60° horizontal angle from normal, and at approximately 85° horizontal angle from normal. Results of experiment 1-1 were as follows:

TABLE 1

| Diffuse Ambient Light: Visual Observation (Experiment 1-1) | | | |
|---|---|---|---|
| position of observer | Formulation A | Formulation B | Formulation C |
| normal | no | no | no |
| 60° | no | no | no |
| 85° | no | no | no |

From all viewing angles, when the boards were illuminated with diffuse ambient lighting, the boards appeared uniform; no image was visible.

In experiment 1-2, the boards were held the same as in experiment 1-1. In each case, diffuse lighting was turned off, and the board was illuminated only by a single, non-extended high-intensity lamp. The observer's eye was held close to the lamp, so that the angle between lines L1 and L2, as described in FIG. 3, was less than 5°. The observation locations were the same as in experiment 1-1. Results were as follows:

TABLE 2

Single Light Source
Visual Observation at the same position as the light source
(Experiment 1-2)

| position of observer | Formulation A | Formulation B | Formulation C |
|---|---|---|---|
| normal | yes | yes | yes |
| 60° | yes | yes | yes |
| 85° | yes | yes | yes |

From all viewing angles, when the boards were illuminated with a single light source and viewed from the same position as the light source, the images were easily visible.

In experiment 1-3, the boards were held the same as in experiment 1-1. In each case, diffuse lighting was turned off, and the board was illuminated only by a single, non-extended high-intensity lamp. For one test, the light source was moved to the left from the normal position to form a horizontal angle of 60° from normal, and the observation point was moved in the opposite direction, to the right to form a horizontal angle of 60° from normal. That is, each of line L1 and line L2 (as defined in FIG. 3) individually forms a horizontal angle of 60° with the line normal to the board, but the angle between L1 and L2 is 120°. For another test, the light source was moved to the left from the normal position to form a horizontal angle of 85° from normal, and the observation point was moved in the opposite direction, to the right to form a horizontal angle of 85° from normal. That is, each of line L1 and line L2 (as defined in FIG. 3) individually forms a horizontal angle of 85° with the line normal to the board, but the angle between L1 and L2 is 170°. Results were as follows:

TABLE 3

Single Light Source
Visual Observation opposite to the light source.
(Experiment 1-3)

| position of observer | Formulation A | Formulation B | Formulation C |
|---|---|---|---|
| 60° | no | no | no |
| 85° | no | no | no |

From all viewing angles, when the boards were illuminated a single, non-extended light source, if the observation point is far from the light source, no image is visible.

In experiments 1-4, 1-5, 2-1, and 2-2, described herein below, photographs were taken and observed for all the samples described. A selection of those photographs, as noted herein below, are included herein to illustrate the effects of the invention.

In experiment 1-4, the boards were held the same as in experiment 1-1. Observation was made by taking a photograph with Photosmart™ M537 digital camera (Hewlett-Packard). The flash light of the camera was turned off. Ratings of "yes" or "no" refer to observation of the photographs. Results were as follows:

TABLE 4

Diffuse Light
Photographic Observation
(Experiment 1-4)

| position of observer | Formulation A | Formulation B | Formulation C |
|---|---|---|---|
| normal | no (FIG. 6, left side) | no (FIG. 6, right side) | no (FIG. 8, left side) |
| 60° | no | no | no |
| 85° | no | no | no (FIG. 10, left side) |

From all viewing angles, when the boards were illuminated by diffuse light, no image is visible in the photographs.

In experiment 1-5, the boards were held the same as in experiment 1-1. Observation was made by taking a photograph with the same camera as in experiment 1-4. The flash light of the camera was turned on, so the observation point (the camera lens) was very close to the light source. Ratings of "yes" or "no" refer to observation of the photographs. Results were as follows:

TABLE 5

Illumination by Flash Unit of the Camera
Photographic Observation
(Experiment 1-5)

| position of observer | Formulation A | Formulation B | Formulation C |
|---|---|---|---|
| normal | yes (FIG. 7, left side) | yes (FIG. 7, right side) | yes (FIG. 9, left side) |
| 60° | yes | yes | yes |
| 85° | yes | yes | yes (FIG. 11, left side) |

From all viewing angles, when the boards were illuminated by the flash unit of the camera, the photographs all clearly showed the images.

EXAMPLE 2

Using the same methods as used for Formulation A, the following comparative formulations were made. The calcium carbonate particles used and the silica particles used are not organic polymeric particles and they are not spherical. Amounts shown are in grams.

| Ingredient | Comparative Formulation C-CC | Comparative Formulation C-S |
|---|---|---|
| water | 137.3 | 128.2 |
| calcium carbonate | 185.4 | |
| silica | | 188.6 |
| defoamer | 0.3 | 0.54 |
| dispersant | 14.9 | 23.29 |
| silicate solution | 36.6 | 57.3 |
| binder | 472.2 | 470.4 |
| defoamer | 0.1 | 0.21 |
| texanol | 6.8 | 10.7 |
| thickener1 | 9.7 | 15.2 |
| thickener2 | 40.2 | 63.0 |
| water | 77.9 | 26.43 |

Characteristics of the formulations were as follows:

| test | Formulation C-CC | Formulation C-S |
|---|---|---|
| pigment volume concentration | 26.8% | 27.5% |
| volume solids | 30.8% | 31% |
| Krebs viscosity | 107 KU | 105 KU |

-continued

| test | Formulation C-CC | Formulation C-S |
|---|---|---|
| ICI viscosity | 0.06 Pa*S (0.6 P) | 0.08 Pa*S (0.8 P) |
| pH | 8.8 | 8.8 |

Using the same methods as in Example 1, wall boards were coated with eggshell paint to form the substrate and then coated with various layers and partial layers of clear coatings using Formulation C, Comparative Formulation C-CC, and Comparative Formulation C-S. The simple geometric shapes were as follows:
(a) Formulation C-CC: pitchfork shape as in Formulation C, with tines down
(b) Formulation C-S: gallows shape, total length approximately three quarters of the length of the board In experiment 2-1, the boards were held and photographed as in experiment 1-4. Results were as follows:

TABLE 6

Diffuse Light
Photographic Observation
(Experiment 2-1)

| position of observer | Comparative Formulation C-CC | Comparative Formulation C-S | Formulation C |
|---|---|---|---|
| normal | yes | yes | no |
| 85° | yes | yes | no |

From all viewing angles, when the boards using formulation C were illuminated by diffuse light, no image is visible in the photographs. When the boards using the Comparative formulations were viewed, the images were visible in the photographs.

In experiment 2-2, the boards were held and photographed as in experiment 1-5 Ratings of "yes" or "no" refer to observation of the photographs. Results were as follows:

TABLE 7

Illumination by Flash Unit of the Camera
Photographic Observation
(Experiment 2-2)

| position of observer | Comparative Formulation C-CC | Comparative Formulation C-S | Formulation C |
|---|---|---|---|
| normal | yes | yes | yes |
| 85° | yes | yes | yes |

From all viewing angles, when the boards were illuminated by the flash unit of the camera, the photographs all clearly showed the images.

The results of experiments 2-1 and 2-2 show that the comparative formulations do not give images that are dependent on observation conditions; those images are apparent both under diffuse lighting conditions and under the special lighting conditions of the present invention. In contrast, Formulation C is apparent in experiment 2-2 but is not apparent under the diffuse lighting conditions of experiment 2-1.

Colorimetric measurements of the boards were made using the L*a*b* scale. Measurements were made on the substrate prior to application of the first clear coating, and measurements were made on the finished boards at locations separate from the simple geometric figures as follows (with reference to FIG. 4):

step 1: between the top of the board and line 15
step 2: between lines 15 and 16
step 3: between lines 15 and 16
step 4: between lines 15 and 16
step 5: between lines 15 and 16

The reported quantity is Delta-E, in which each step is compared to the L*a*b* readings of the substrate on that board. The results were as follows:

| Formulation | step 1 | step 2 | step 3 | step 4 | step 5 |
|---|---|---|---|---|---|
| C | 0.31 | 0.24 | 0.40 | 0.36 | 0.39 |
| C-CC | 1.37 | 4.03 | 7.18 | 9.23 | 12.08 |
| C-S | 0.78 | 0.96 | 1.68 | 3.36 | 3.62 |

These Delta-E measurements correspond to observation under diffuse lighting conditions, because the observation point is far from colinear with the light source. The results for the comparative formulations (C-CC and C-S) show that total color difference from the substrate increased at each step. This result is consistent with the visual observation that, under diffuse lighting, on the comparative formulations, each step is easily distinguishable from the previous step. The results for the inventive formulation (C) show that there is no appreciable color difference from one step to the next. This result is consistent with the visual observation that, under diffuse lighting, on the inventive formulation, the individual steps are not visible.

The invention claimed is:

1. An article having a condition-dependent image, said article comprising
   (a) a substrate having a surface,
   (b) upon the surface of the substrate, one or more layers of a clear coating comprising a plurality of beads having a weight-average diameter,
      wherein there are a first area and a second area on the surface of said substrate,
   wherein the first area has a total thickness of all layers of said clear coating of T1,
   wherein the second area has a total thickness of all layers of said clear coating of T2,
   wherein the difference between T1 and T2 is equal to or greater than the weight average diameter of said plurality of beads,
   wherein said beads are spherical,
   wherein said beads do not contain voids,
   wherein said beads comprise organic polymer, and
   wherein the index of refraction of said beads is 1.4 to 1.65.

2. The article of claim 1, wherein said clear coating additionally comprises a binder having an index of refraction, and where the absolute value of the difference between the index of refraction of said binder and the index of refraction of said beads is 0.1 or less.

3. The article of claim 1, wherein said binder comprises a polymer having glass transition temperature of 0° C. to 30° C.

4. The article of claim 1, wherein said binder comprises a polymer having glass transition temperature of −40° C. to −1° C.

5. The article of claim 1, wherein the weight-average diameter of said beads is 2 to 15 micrometers.

6. The article of claim 1, wherein at least 90% by weight of said plurality of beads are beads that have diameter that is greater than or equal to 0.8 times the weight-average diameter of said plurality of beads and that have diameter that is less than or equal to 1.2 times the weight-average diameter of said plurality of beads.

7. The article of claim 1, wherein said substrate is opaque.

8. A method of producing an image comprising:
   (a) providing the optical effect article of claim 1,
   (b) illuminating the surface of said article with a single, non-extended light source, wherein said light source lies on a line L1 that passes through the center of said light source and the center of said surface, and
   (c) simultaneous with step B, observing said surface from an observation point that is on the same side of said surface as said light source and that lies on a line L2 that passes through said observation point and the center of said surface, wherein the angle between said line L1 and said line L2 is 10 degrees or less.

9. A method of producing an article having a condition-dependent image, said method comprising
   (a) providing a substrate having a surface
   (b) applying an area AB of a layer LB of a coating composition CB on the surface of the substrate, then drying said layer LB or allowing said layer LB to dry, wherein coating composition CB, when dry, forms a clear coating,
   (c) then applying an area AC of a layer LC of a coating composition CC on the surface of the substrate, so that area AB overlaps area AC, then drying layer LC or allowing said layer LC to dry, wherein coating composition CC, when dry, forms a clear coating,
   wherein each of said coating composition CB and said coating composition CC independently comprises a binder and plurality of beads having a weight-average diameter,
      wherein there are a first area and a second area on the surface of said substrate,
   wherein the first area has a total thickness of all layers of said clear coatings of T1,
   wherein the second area has a total thickness of all layers of said clear coatings of T2,
   wherein the difference between T1 and T2 is equal to or greater than the weight average diameter of said plurality of beads,
      wherein said beads are spherical,
      wherein said beads comprise organic polymer, and
      wherein the index of refraction of said beads is 1.4 to 1.65.

10. The method of claim 9, wherein said substrate is opaque.

* * * * *